United States Patent [19]
Hiraki et al.

[11] Patent Number: 5,699,115
[45] Date of Patent: Dec. 16, 1997

[54] ELECTRONIC VIEWFINDER HAVING MEANS FOR TURNING OFF A DISPLAY DEVICE

[75] Inventors: Hiroshi Hiraki, Tokyo; Toshio Koyama, Kanagawa; Yoshihiro Ono, Saitama; Katsuhiko Ueno, Kanagawa; Satoshi Kimura, Tokyo, all of Japan

[73] Assignee: Sony Corporation, Tokyo, Japan

[21] Appl. No.: 433,706

[22] Filed: May 2, 1995

[30] Foreign Application Priority Data

May 19, 1994 [JP] Japan ............... 6-096050
Jul. 13, 1994 [JP] Japan ............... 6-161301

[51] Int. Cl.$^6$ ........................... H04N 5/232
[52] U.S. Cl. ............. 348/333; 348/372; 348/341
[58] Field of Search ............... 348/333, 372, 348/341; 396/374; H04N 5/225, 5/232

[56] References Cited

U.S. PATENT DOCUMENTS

| | | | |
|---|---|---|---|
| 4,873,576 | 10/1989 | Hattori et al. | 348/333 |
| 5,200,774 | 4/1993 | Nakajima. | |
| 5,313,305 | 5/1994 | Harigaya et al. | 348/214 |
| 5,359,384 | 10/1994 | Ide | 354/403 |

FOREIGN PATENT DOCUMENTS

| | | | |
|---|---|---|---|
| 0 302 689 | 2/1989 | European Pat. Off. . | |
| 40 20 594 | 1/1991 | European Pat. Off. . | |
| 05191712 | 7/1993 | Japan | H04N 5/232 |
| 06105191 | 4/1994 | Japan | H04N 5/225 |
| 07099598 | 4/1995 | Japan | H04N 5/232 |

OTHER PUBLICATIONS

Patent Abstracts of Japan, vol. 016 No. 056 (P-1310), 12 Feb. 1992, JP-A-03 255429 (Stanley Electric Co Ltd) 14 Nov. 1991.

Patent Abstracts of Japan, vol. 016 No. 469 (E-1271), 29 Sep. 1992, JP-A-04 167679 (Sony Corp) 15 Jun. 1992.

Patent Abstracts of Japan, vol. 017, No. 421 (E-1409), Aug. 5, 1993, and JP-A-05 083608 (Canon Inc.), Apr. 2, 1993.

Patent Abstracts of Japan, vol. 018, No. 566 (E-1622), Oct. 28, 1994, and JP-A-06 205343 (Sharp Corp.), Jul. 22, 1994.

Videofilmen, vol. 10, No. 5, Oct. 5, 1993, Berlin, Germany, "Sony Camcorder mit LCD-Display", p. 4.

Patent Abstracts of Japan, vol. 016, No. 492 (E-1278), Oct. 12, 1992, and JP-A-04 180475 (Matsushita Electric Ind. Co. Ltd.), Jun. 26, 1992.

Patent Abstracts of Japan, vol. 16, No. 263 (E-1216), Jun. 15, 1992, and JP-A-04 058680 (Canon Inc.), Feb. 25, 1992.

Patent Abstracts of Japan, vol. 16, No. 263 (E-1216), Jun. 15, 1992, and JP-A-04 058679 (Canon Inc.), Feb. 25, 1992.

*Primary Examiner*—Wendy Garber
*Attorney, Agent, or Firm*—William S. Frommer; Alvin Sinderbrand

[57] ABSTRACT

The user observes a liquid crystal display panel screen positioned within a lens barrel through a lens. An infrared LED that emits pulses of light and a phototransistor are positioned in an eyecup against which the user's eye is pressed. An ambient light detecting circuit provides a control signal showing whether or not the user's eye is pressed against the eyecup and a control signal showing the amount of ambient light on the basis of the output signal of the phototransistor. A control circuit controls the luminance of a backlight unit according to the control signals. When the user's eye is not pressed against the eyecup, the display luminance is reduced to zero and the display is turned off. The display luminance is enhanced only when the amount of ambient light is large. Thus, needless power consumption can be avoided, and the screen can be satisfactorily observed even if a large quantity of light enters into the ocular part where the ambient light is bright.

22 Claims, 12 Drawing Sheets

ELECTRONIC VIEWFINDER HAVING MEANS FOR TURNING OFF A DISPLAY DEVICE

BACKGROUND OF THE INVENTION

1. Field of the Invention

The present invention relates to an electronic viewfinder suitable for use on, for example, a camera video tape recorder (VTR) or the like, and to a camera VTR for recording an video image on video tape and for playback of the video tape.

2. Description of the Related Art

Figure 10:
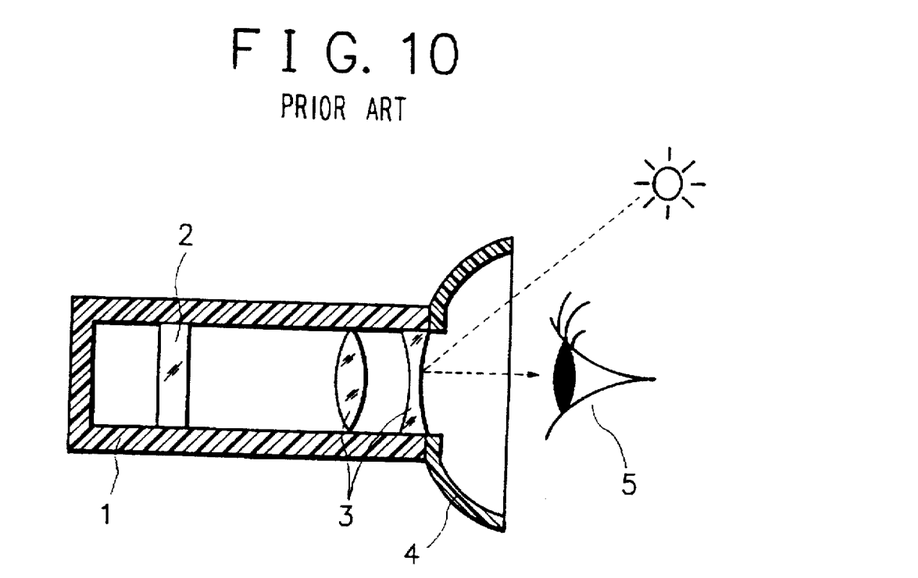
FIG. 10 is a sectional view of a conventional electronic viewfinder.

Referring to FIG. 10 showing a conventional electronic viewfinder (EVF), a liquid crystal display panel 2 and a lens 3 are arranged in a lens barrel 1, and an eyecup 4 is joined to the open end of the lens barrel 1 on the lens side 3. The user presses his/her eye 5 to the eyecup 4 to observe the display panel screen 2.

Figure 16:
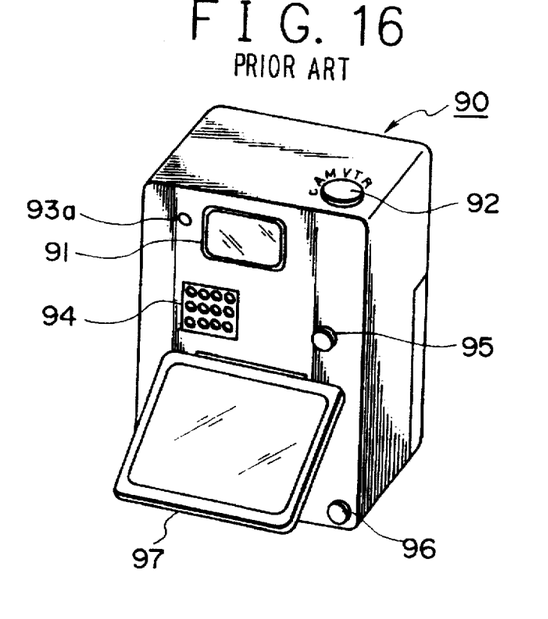
FIG. 16 is a view of a construction of a user's control side of a camera video tape recorder with video camera with an OVF and a LCD panel from the prior art.
Figure 17:
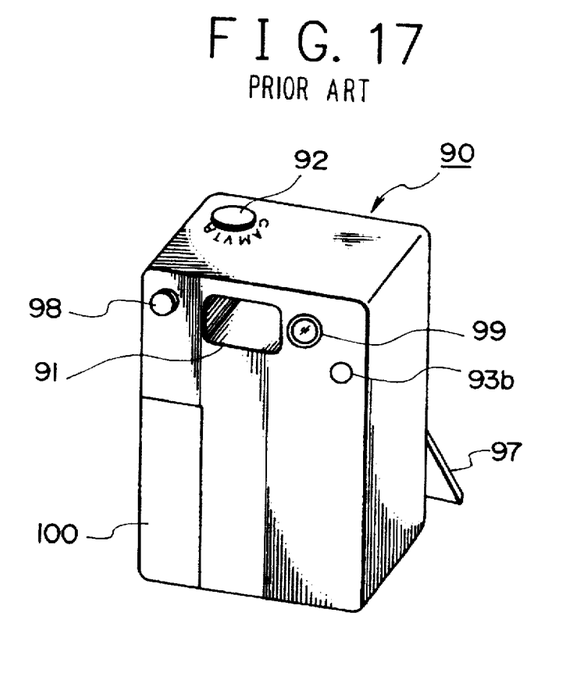
FIG. 17 is a view of a construction of a camera lens side of the video tape recorder with video camera shown in FIG. 16.

FIG. 16 and FIG. 17 illustrate the construction of a typical camera video tape recorder having an optical viewfinder (OVF) and a LCD (liquid crystal display) panel. The user switches a camera/video change-over switch 92 to the camera mode, pushes a recording button 98, and videotapes a subject while observing through the OVF 91 or the LCD panel 97. The video tape recorder with video camera 90 records the video image through a camera lens 99 onto video tape (not shown). During the videotaping, the recording LEDs 93a and 93b are lit.

During the videotaping, the LCD panel 97 displays the image of the subject being recorded when a LCD panel switch 96 for turning on or off the power supply to the LCD panel is turned on. When the LCD panel switch 96 is turned off, the LCD panel 97 displays nothing.

When a user switches the camera/video change-over switch 92 to the video mode, pushes a playback button 95, and turns the LCD panel switch 96 on, the recorded image is played back and displayed on the LCD panel 97, during which time the user may enjoy watching the playback video image. The related art is disclosed in U.S. Pat. No. 5,093,716 and Japanese Patent Application No. H05-320040 filed on Dec. 12, 1993 by the present applicant.

With this electronic viewfinder, any light entering the ocular unit and reaching the electronic viewfinder is reflected by the surface of the lens 3 back toward the user's eye 5, making it difficult for the user to fully observe the display panel screen 2. More light leaking into the ocular unit, particularly when the user wears eye-glasses, makes it even more difficult for the user to observe the display panel screen 2.

It is possible to consider enhancing the luminance of the display panel screen 2, thus allowing satisfactory viewing even with light entering the ocular unit. Thus, however, would be a waste of power in situations where enhanced luminance is not necessary, such as when the ambient light is not bright as for indoor filming or when the eyecup is not being significantly used by the user.

Accordingly, the present invention provides an electronic viewfinder which does not waste power and yet enables satisfactory observation of the screen even if light leaks into the ocular unit.

Further, if the user videotapes an image using the OVF 91 when the LCD panel switch 96 is turned on, the LCD panel 97 displays the image being recorded though the user is not watching it.

In general, the power consumed by a LCD panel in use varies according to its size. A LCD panel 3 inches wide, for example, consumes 2.5 W to 3.0 W of power when in use. When the user videotapes an image, using the OVF 91, the LCD panel 97 wastes power, the battery is consumed rapidly and the operating time of the video recorder is shortened.

It is accordingly an object of the present invention to provide an improved video tape recorder which can prevent unnecessary consumption of power.

SUMMARY OF THE INVENTION

An electronic viewfinder according to the present invention is comprised of an ocular unit, a sample-hold means, a mean level detecting means, a difference detecting means, a first control means, and a second control means. The ocular unit is provided with a pulse light emitter and a light receiver. The sample-hold means samples the output signal from the light receiver and holds sampled signals. The sampling operation is timed together with the light emitting operation of the pulse light emitter. The mean level detecting means detects the mean level of the output signal of the light receiver. The difference detecting means detects the difference of the signal sampled and held by the sample-hold means from the mean level detected by the mean level detecting means. The first control means sets the a display device in the "power off" state when the difference detected by the difference detecting means is less than a predetermined value. The second control means controls the luminance of the display device according to the mean level detected by the mean level detecting means.

A camera video tape recorder according to the present invention is comprised of a viewfinder means, a display means, a detection means, and a control means. A user observes an object through the viewfinder means. The display means is larger than the viewfinder means and is capable of displaying an image electrically for a number of users. The detection means detects an approach of a user to the display means. The control means controls the power of the display means in response to a wave detection output from the detection means.

According to the present invention, the display device is set in the "power off" state when the magnitude of the difference detected by the difference detecting means is less than a predetermined value. When the user's eye is not pressed against the ocular unit (the eyecup) and the electronic viewfinder is not actually being used, light emitted by the pulse light emitter is not reflected by the user's eye and does not fall on the light receiver, thus, the magnitude of the difference detected by the difference detecting means is less than the predetermined value and the display device is set in the "power off" state. Consequently, needless power consumption can be avoided.

The luminance of the display device is controlled according to the mean level of the output signal of the light receiver detected by the mean level detecting means. Therefore, the mean level of the output signal of the light receiver rises and the luminance of the display device is enhanced, when the ambient light is bright and the quantity of light leaking into the ocular unit is increased. Consequently, the screen of the display device can be clearly seen even when light leaks into the ocular unit. Since the luminance of the screen of the display device is reduced when the ambient light is not very bright, useless power consumption can be avoided.

A video camera constructed as described above, detects a user using a OVF 51 with a light-receiving device 75 and automatically turns off power to the LCD panel 57, preventing power from being consumed needlessly.

The video camera according to the present invention can turn off the power for an electric display when a user observes through a viewfinder means a prevents the battery power from being consumed too rapidly.

Additional objects and advantages of the present invention will be apparent from the following detailed description of a preferred embodiment thereof, which is best understood with reference to the accompanying drawings.

DESCRIPTION OF THE PREFERRED EMBODIMENT

An electronic viewfinder in a preferred embodiment according to the present invention will be described hereinafter with reference to FIG. 1, in which parts like or corresponding to those shown in FIG. 10 are designated by the same reference characters and the description thereof will be omitted.

Figure 1:
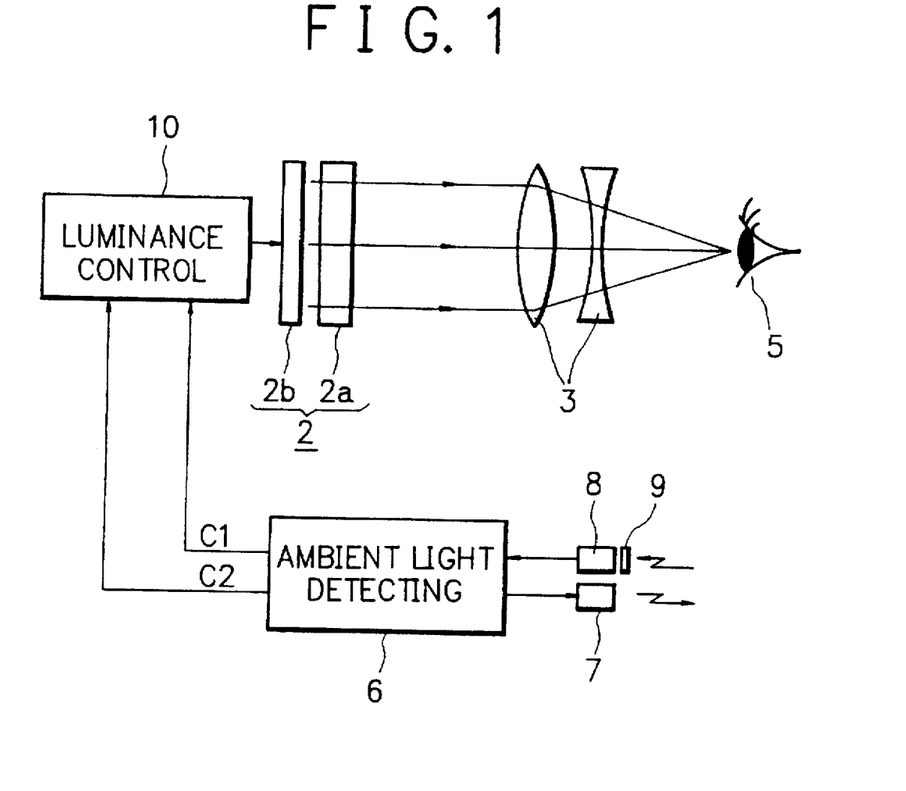
FIG. 1 is a block diagram of an electronic viewfinder in a preferred embodiment according to the present invention.

Referring to FIG. 1, a liquid crystal display panel 2 comprises a panel unit 2a and a backlight unit 2b. As is generally known, the panel unit 2a has liquid crystal display cells and a driver. The panel unit 2a is connected to a power supply, not shown, and receives video signals representing a video image. As is generally known, the backlight unit 2b has a fluorescent lamp and is connected to a power supply, not shown. Light emitted by the backlight unit 2b travels through the panel unit 2a, which limits the amount of light transmitted by each pixel and thereafter transmits the light through lens 3 to the user's eye 5, forming an image of video signals on the panel unit screen 2a.

An infrared light emitting diode 7 serving as a pulse light emitter, and a phototransistor 8 serving as a light receiver are connected to an ambient light detecting circuit 6. A visible radiation cutting filter 9 is positioned on the light receiving side of the phototransistor 8 to intercept visible radiation. Signals C1 and C2 provided by the ambient light detecting circuit 6 are given as control signals to a luminance control circuit 10 for controlling the luminance of the backlight unit 2b.

Figure 2:
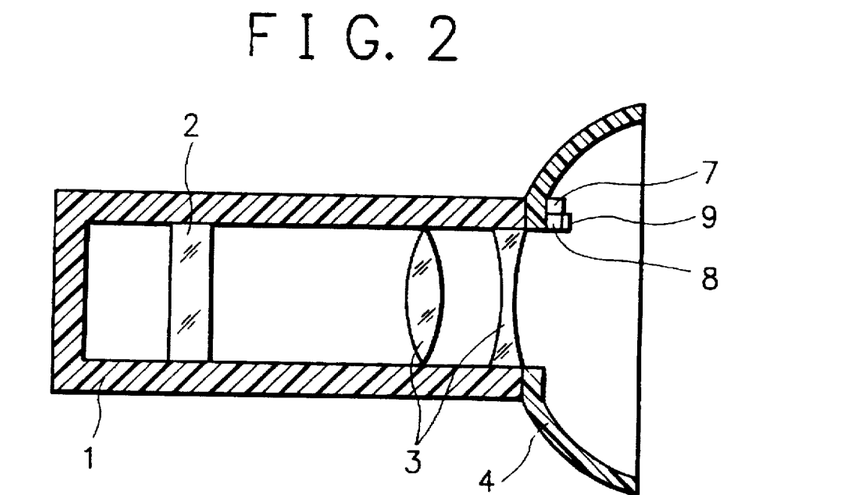
FIG. 2 is a sectional view showing the arrangement of a light emitting diode and a phototransistor.

As shown in FIG. 2, the light emitting diode 7 and the phototransistor 8 are placed, for example, at positions within the eyecup 4 where the light emitting diode 7 and the phototransistor 8 are not significantly exposed to the direct sunshine in order to avoid saturation of the phototransistor 8. Since the light emitting diode 7 and the phototransistor 8 are positioned within the eyecup 4, infrared light emitted by the light emitting diode 7 is reflected by the user's eye toward the phototransistor 8 when the user's eye 5 is pressed against the eyecup 4. The light emitting diode 7 and the phototransistor 8 are positioned so that the radiation emitted by the light emitting diode will not directly hit the phototransistor 8.

Figure 3:
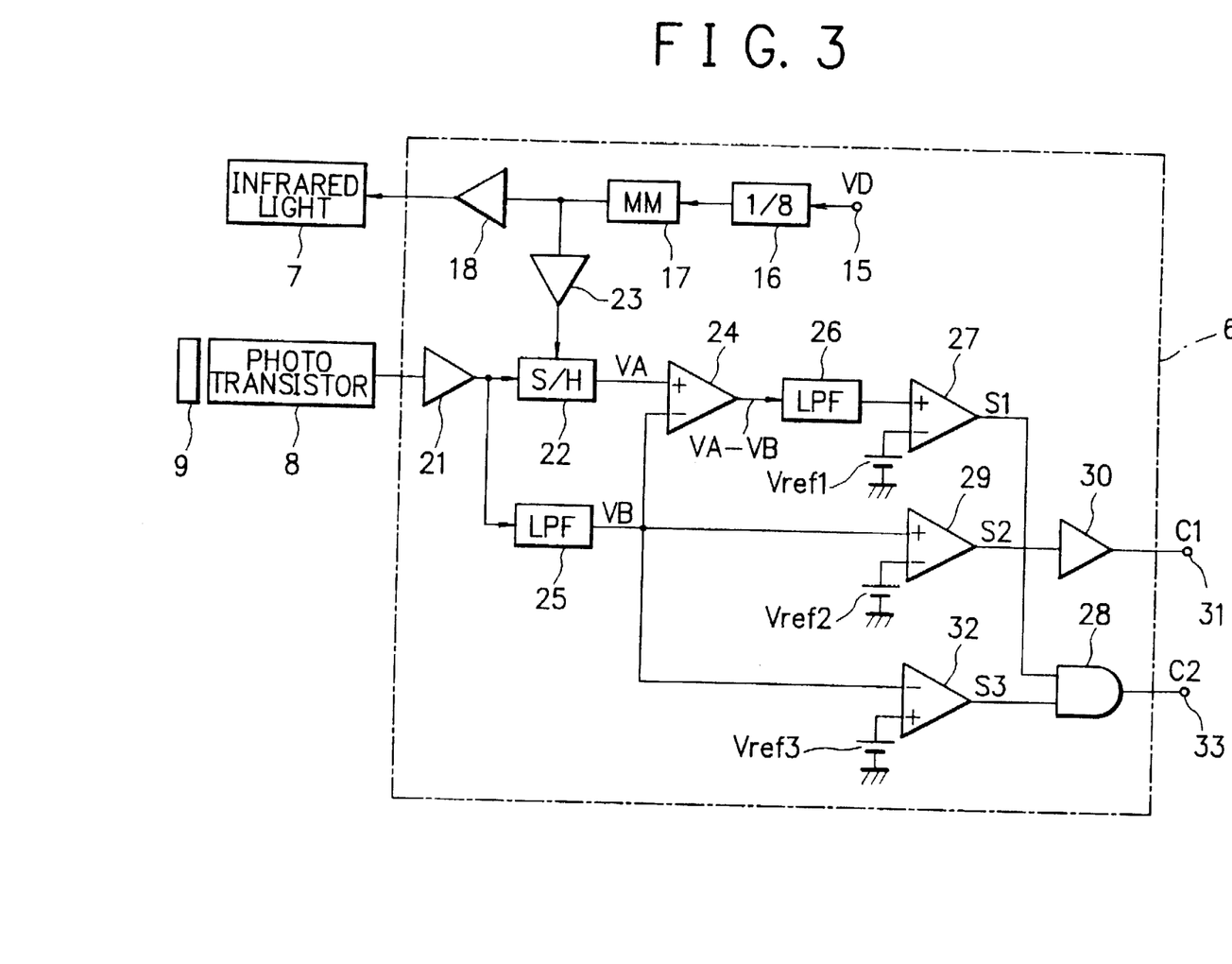
FIG. 3 is a block diagram of an ambient light detecting circuit.

Referring to FIG. 3 showing the configuration of the ambient light detecting circuit 6, a vertical synchronizing signal VD (length of time=1/60 second) applied to an input terminal 15 is provided to a monostable multivibrator 17 as a trigger signal after the frequency of the vertical synchronizing signal VD has been reduced down by a factor of eight. The monostable multivibrator 17 gives a pulse signal of a predetermined pulse width, such as 1 microsecond, for a period of 8/60 seconds to a drive circuit 18, and then the drive circuit 18 drives the light emitting diode 7 to emit infrared light at a cycle of 60/8 per second.

An amplifier 21 amplifies the output signal of the phototransistor 8 and the output signal of the amplifier 21 is provided to a sample-hold circuit 22. The output pulse signal of the monostable multivibrator 17 is applied as a sampling pulse signal through a buffer amplifier 23 to the sample-hold circuit 22. The sample-hold circuit 22 samples and holds the output signal of the amplifier 21 each time the light emitting diode 7 emits infrared light.

Figure 4A:
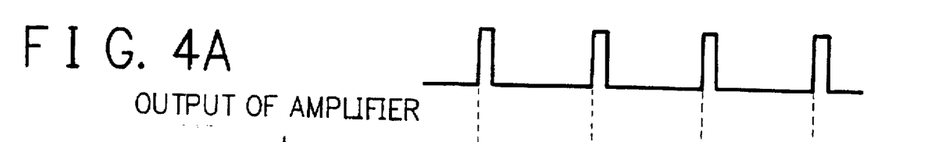
FIGS. 4A and 4B are waveform diagrams of essential signals used by the ambient light detecting circuit of FIG. 3.
Figure 4B:
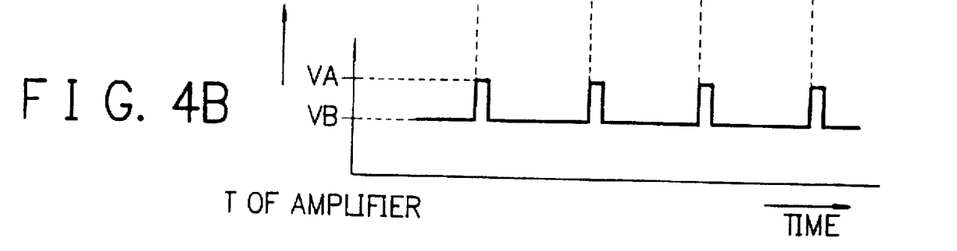

FIG. 4A shows the output pulse signal of the monostable multivibrator 17 and FIG. 4B shows the output signal of the amplifier 21 when the user's eye 5 is pressed against the eyecup 4. As is obvious from FIGS. 4A and 4B, the sample-hold circuit 22 samples and holds a signal VA and applies the signal VA to the positive terminal of a subtracter 24.

The output signal of the amplifier 21 is provided to a low-pass filter 25 serving as a mean level detecting means, and the low-pass filter 25 provides a signal VB indicating the mean level of the output signal of the amplifier 21. Since the pulse width of the output pulse signal of the monostable multivibrator 17 is small, the signal VB is approximately equal to the low level of the output signal of the amplifier 21. The signal VB may be obtained by sampling and holding the low level of the output signal of the amplifier 21 by using a signal obtained by inverting the output pulse signal of the monostable multivibrator 17.

The output signal VB of the low-pass filter 25 is provided to the negative terminal of the subtracter 24. The subtracter 24 subtracts the signal VB from the signal VA using a coefficient 1:1 in order to obtain the difference (VA−VB). The difference (VA−VB) calculated by the subtracter 24 is sent through a low-pass filter 26 to a comparator 27. A reference signal Vref1 is given from the comparator 27. The output signal S1 of the comparator 27 is determined to be HIGH when (VA−VB)≧Vref1 or LOW when (VA−VB) <Vref1. The output signal S1 from the comparator 27 is provided to an AND circuit 28.

The output signal VB of the low-pass filter 25 is provided to a comparator 29. A reference signal Vref2 is given to the comparator 29. The output signal S2 from the comparator 29 is determined to be HIGH when VB≧Vref2 or LOW when VB<Vref2. The output signal S2 from the comparator 29 is sent as a control signal C1 through a buffer amplifier 30 to an output terminal 31.

The output signal VB of the low-pass filter 25 is also provided to a comparator 32. A reference signal Vref3 (Vref3>Vref2) is given to the comparator 32. The output signal S3 from the comparator 31 is determined to be LOW when VB>Vref3 or HIGH when VB≦Vref3. The output signal S3 from the comparator 32 is given to the AND circuit 28. The output signal of the AND circuit 28 is applied as a control signal C2 to an output terminal 33.

Referring again to FIG. 1, the luminance control circuit 10 controls the backlight unit 2b to adjust the luminance of the backlight unit 2b, i.e., the display luminance, to a normal luminance when the control signal C1 is LOW and to adjust the luminance of the backlight unit 2b to a high luminance, higher than the normal luminance, when the control signal C1 is HIGH. The luminance control circuit 10 turns on the backlight unit 2b and turns on the display when the control signal C2 is HIGH and turns off the backlight unit 2b and turns off the display when the control signal C2 is LOW.

Suppose that the user's eye 5 is not pressed against the eyecup 4 and the electronic viewfinder is not actually being used. In this state, the infrared light emitted by the light emitting diode 7 is not reflected by the user's eye 5 toward the phototransistor 8 and hence the difference (VA−VB) calculated by the subtracter 24 is less than the reference signal Vref1. Consequently, the output signal S1 of the comparator 27 is set to LOW, and output signal C2 of the AND circuit 28 is also set to LOW, and the luminance control circuit 10 turns off the backlight unit 2b and the display.

When the user's eye 5 is pressed against the eyecup 4, the infrared light emitted by the light emitting diode 7 is reflected by the user's eye 5 toward the phototransistor 8 and therefore the difference (VA−VB) calculated by the subtracter 24 is greater than the reference signal Vref1. Consequently, the output signal S1 of the comparator 27 is set to HIGH, the control signal C2 provided by the AND circuit 28 is also set to HIGH, and the luminance control circuit 10 turns on the backlight unit 2b and the display.

When the electronic viewfinder is being used by the user in this fashion when the ambient light is not bright, indoors for example, the output signal VB of the low-pass filter 25 is less than the reference signal Vref2 because the amount of light that leaks into the eyecup 4 is comparatively small. Consequently, the control signal C1 provided by the comparator 29 is set to LOW and the luminance control circuit 10 adjusts the display luminance to the normal luminance.

When the electronic viewfinder is used where the ambient light is bright, outdoors for example, the output signal VB of the low-pass filter 25 is greater than the reference signal Vref2 because the amount of light that leaks into the eyecup 4 is comparatively large. Consequently, the control signal C1 provided by the comparator 29 is set to HIGH and the luminance control circuit 10 adjusts the display luminance higher than normal.

Thus, the display is turned off in a state where the user's eye 5 is not pressed against the eyecup 4 and the electronic viewfinder is not actually being used. The display luminance is adjusted to normal luminance when the user's eye 5 is pressed against the eyecup 4 and the electronic viewfinder is used, where there is not very much ambient light. In this manner needless power consumption can be avoided. Furthermore, since the display luminance is adjusted to a higher than normal luminance when the user's eye 5 is pressed against the eyecup 4 and the electronic viewfinder is used where the ambient light is bright, the image displayed on the screen of the display panel 2 can be clearly seen even if light leaks into the ocular unit.

The output signal VB of the low-pass filter 25 is greater than the reference signal Vref3 when the user's eye 5 is not pressed against the eyecup 4 and the electronic viewfinder is not actually being used. Consequently, the output signal S3 of the comparator 32 is set to LOW and the control signal C2 provided by the AND circuit 28 is also set to LOW. Therefore, the display will certainly be turned off even if the output signal S1 from the comparator 27 does not changed to LOW due to a malfunction of the sample-hold circuit 22, the subtracter 24 or the comparator 27, for example, avoiding needless power consumption.

Figure 5:
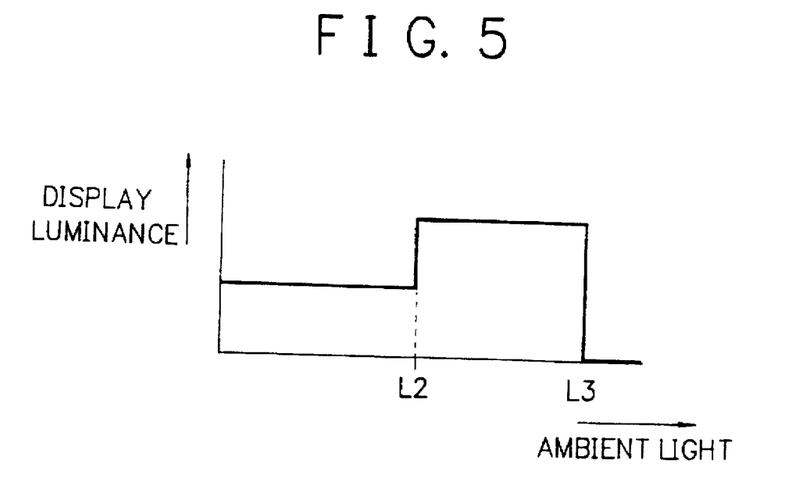
FIG. 5 is a graph showing the relation between the quantity of ambient light and the display luminance in the ambient light detecting circuit of FIG. 3.

FIG. 5 is a graph showing the relation between the amount of ambient light and display luminance when the output signal S1 from the comparator 27 is set to HIGH. In FIG. 5, L2 is the amount ambient light corresponding to the reference signal Vref2 provided to the comparator 29, and L3 is the amount of ambient light corresponding to the reference signal Vref3 provided to the comparator 31.

Since the light emitting diode 7 emits pulses of infrared light and the visible radiation cutting filter 9 is positioned in front of the light receiving surface of the phototransistor 8, on and off control operations for the display and control operations for the luminance can be satisfactorily carried out without being affected by additional amounts of light from the outside. Since the light emitting diode 7 emits pulses of infrared light at a period of 8/60 second and the frequency of pulse emission is not higher than 10 Hz, the influence of the variation of the quantity of light emitted by the fluorescent lamp (50 or 60 Hz) on the output signal of the sample-hold circuit 22 can be certainly avoided when the sampling theorem is taken into consideration.

The configuration of an ambient light detecting circuit 6 included in an electronic viewfinder in another embodiment according to the present invention will be described below with reference to FIG. 6, in which parts like or corresponding to those shown in FIG. 3 are denoted by the same reference characters and the description thereof will be omitted.

Figure 6:
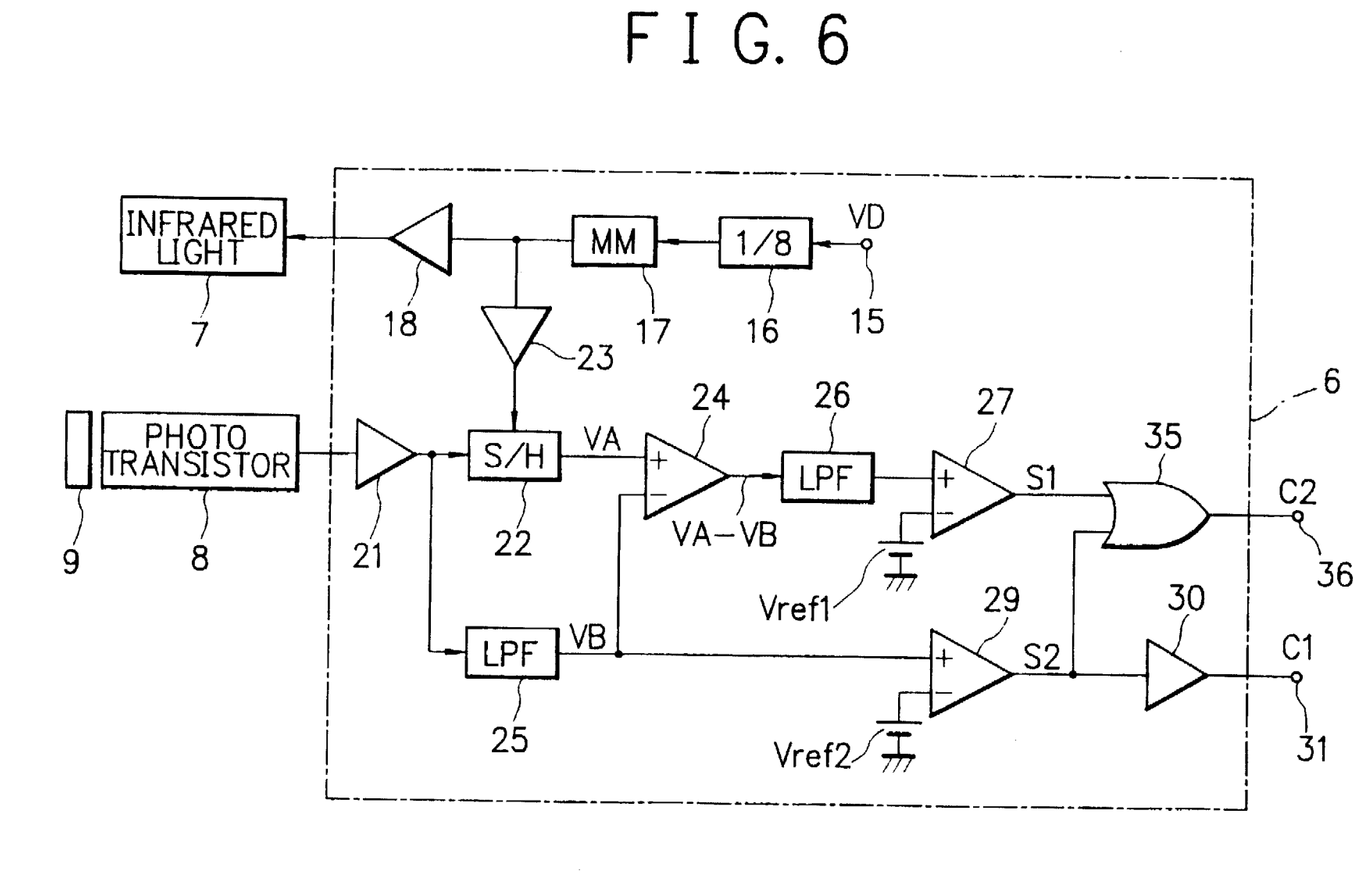
FIG. 6 is a block diagram of an ambient light detecting circuit employed in another embodiment of the present invention.

Referring to FIG. 6, the respective output signals S1 and S2 of comparators 27 and 29 are provided to an OR circuit 35, and then the output signal of the OR circuit 35 is applied as a control signal C2 to an output terminal 36. The rest of the components of this ambient light detecting circuit 6 are similar to those of the ambient light detecting circuit 6 shown in FIG. 3. The ambient light detecting circuit 6 is not provided with any parts corresponding to the AND circuit 28 or to the comparator 29 of the ambient light detecting circuit 6 of FIG. 3.

If the electronic viewfinder is used when the ambient light is bright, outdoors for example, a comparatively large amount of light leaks into the eyecup 4. Therefore, the output signal VB from the low-pass filter 25 is greater than the reference signal Vref2 and the output signal S2 from the comparator 29 is set to HIGH. Consequently, the control signal C2 provided by the OR circuit 35 is always set to HIGH, irrespective of the output signal S1 from the comparator 27, and the display is kept on as long as the electronic viewfinder is used with bright ambient light.

When the ambience is light and a very large quantity of light leaks into the eyecup 4, the output signal VA from the sample-hold circuit 22 is saturated and the output signal VB of the low-pass filter 25 comes close to equalling the signal VA, and in some cases, the difference (VA–VB) calculated by the subtracter 24 becomes less than the reference signal Vref1 and the output signal S1 from the comparator 27 is set to LOW. As mentioned above, since the control signal C2 provided by the OR circuit 35 is kept at HIGH by the output signal S2 from the comparator 29 in this embodiment, the erroneous action that turns off the display when the user's eye 5 is pressed against the eyecup 4 and the electronic viewfinder is actually being used can be prevented.

Figure 7:
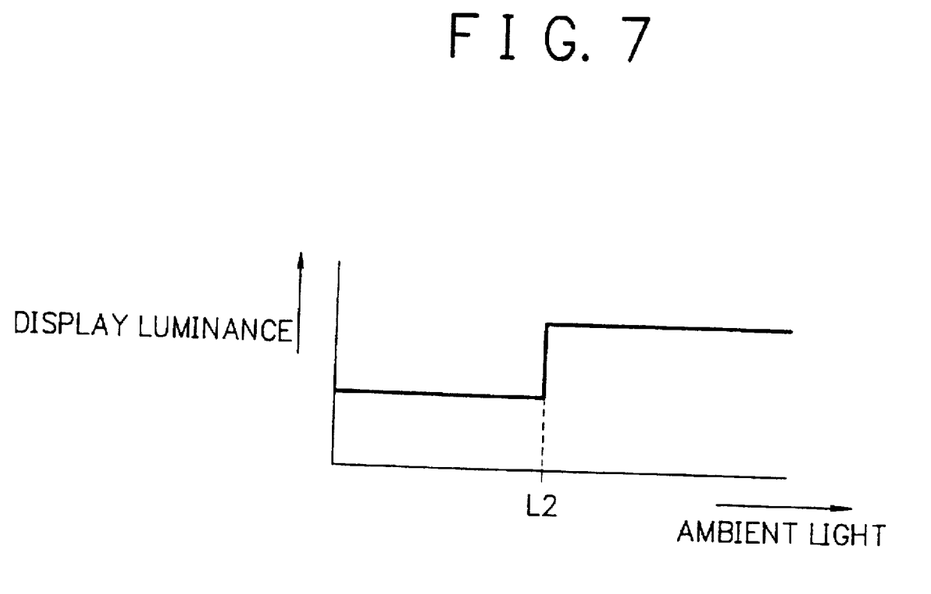
FIG. 7 is a graph showing the relation between the quantity of ambient light and the display luminance in the ambient light detecting circuit of FIG. 6.

FIG. 7 shows the relation between the amount of ambient light and the display luminance when the output signal S1 of the comparator 27 is set to HIGH. In FIG. 7, L2 is the amount of ambient light corresponding to the reference signal Vref2 applied to the comparator 29. Other operations of this embodiment are the same as those of the ambient light detecting circuit shown in FIG. 3 and hence the description will be omitted.

Figure 8:
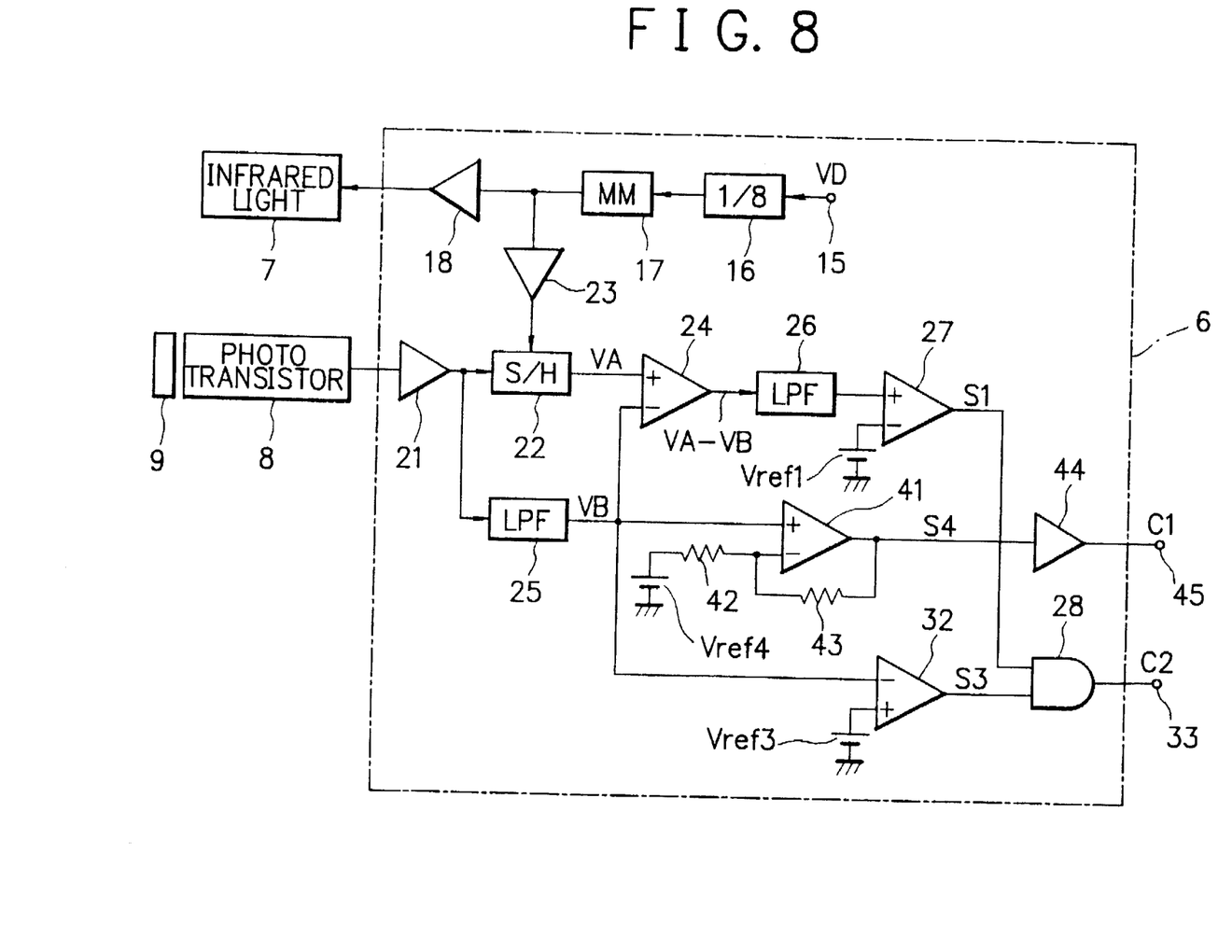
FIG. 8 is a block diagram of an ambient light detecting circuit employed in another embodiment of the present invention.

The configuration of an ambient light detecting circuit 6 included in an electronic viewfinder in a third embodiment according to the present invention will be described hereinafter with reference to FIG. 8, in which parts like or corresponding to those of the ambient light detecting circuit shown in FIG. 3 are designated by the same reference characters and the description thereof will be omitted.

The ambient light detecting circuit in this embodiment is provided with an operational amplifier 41 instead of the comparator 29 of the embodiment shown in FIG. 3. The output signal VB from a low-pass filter 25 is applied to the noninverting input terminal of the operational amplifier 41. A voltage Vref4 is applied through a resistor 42 to the inverting input terminal of the operational amplifier 41, and the output terminal of the operational amplifier 41 is connected through a resistor 43 to the inverting input terminal. A signal S4 continuously varying according to the increase of the output signal VB is applied to the output terminal of the operational amplifier 41. The signal S4 is sent as a control signal C1 through a buffer amplifier 44 to an output terminal 45. A luminance control circuit 10 performs a control operation on the basis of the control signal C1 so that the luminance of a backlight unit 2b, hence the display luminance, varies continuously. This embodiment is similar in other respects to the embodiment shown in FIG. 3.

Figure 9:
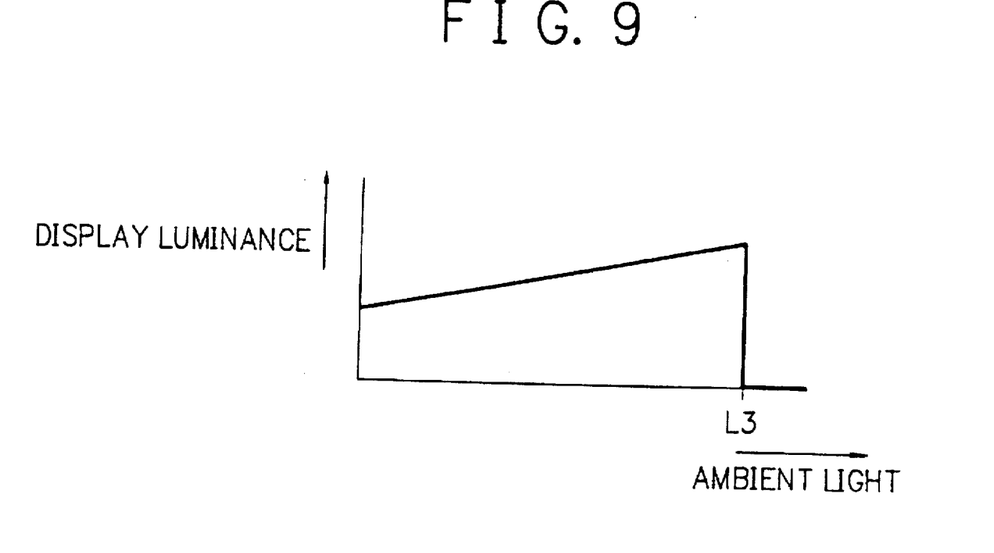
FIG. 9 is a graph showing the relation between the quantity of ambient light and the display luminance in the ambient light detecting circuit of FIG. 8.

FIG. 9 shows the relation between the quantity of ambient light and the display luminance when the output signal S1 of the comparator 27 is set to HIGH. In FIG. 9, L3 is the amount of ambient light corresponding to the reference signal Vref3 applied to the comparator 32. This embodiment is able to vary the display luminance continuously according to the amount of ambient light in order to avoid abrupt changes in the display luminance.

Although the ambient light detecting circuit 6 in the foregoing embodiment produces the control signals C1 and C2 using hardware, the control signals C1 and C2 can be produced by subjecting the output signal VA of the sample-hold circuit 22 and the output signal VB is the low-pass filter 25 to A/D conversion and processing the signals obtained by A/D conversion using software from a microcomputer, for example.

Although the foregoing embodiments turn off the display when the user's eye 5 is not pressed against the eyecup 4 and the electronic viewfinder is not actually being used, the display luminance may simply be reduced rather than having the display turned off.

Although the foregoing embodiments employ a liquid crystal display panel 2, naturally, the present invention is similarly applicable to an electronic viewfinder employing a display device other than a liquid crystal display panel 2, such as a small CRT.

Figure 11:
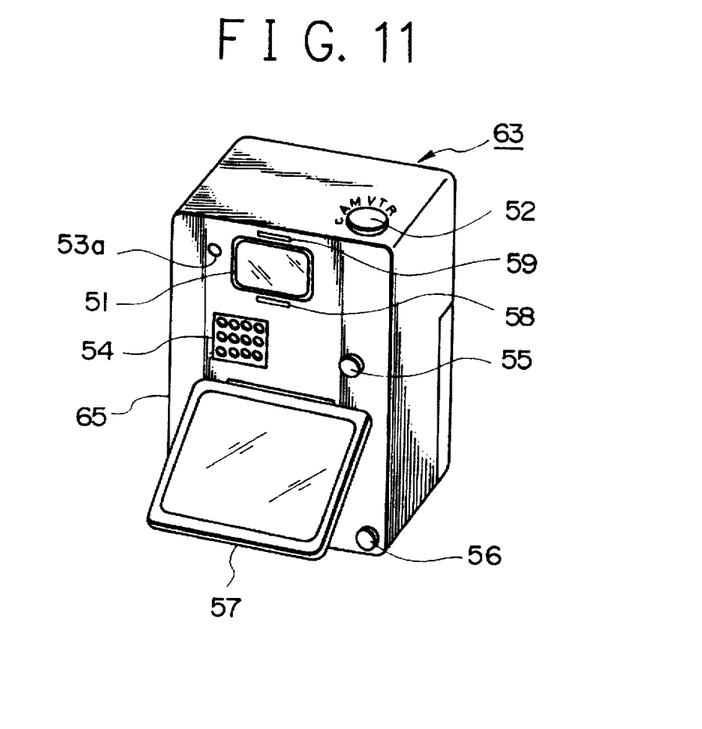
FIG. 11 is a view of a construction of the user's control side of an embodiment of a video tape recorder with video camera according to the present invention.
Figure 12:
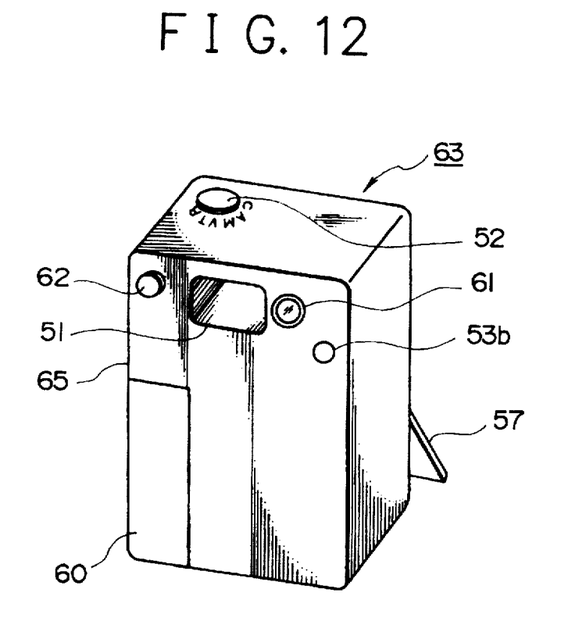
FIG. 12 is a view of a construction of the camera lens side of the video tape recorder with video camera of FIG. 11.

FIG. 11 and FIG. 12 illustrate a construction of a video tape recorder according to the present invention. The video tape recorder with the video camera 63 records images with a camera lens 61, when a camera/video change-over switch 52 is switched to the camera mode and a recording button 62 is pushed. A user can observe the subject to be videotaped through the OVF 51. While recording, the recording LED 53a and 53b is turn on. A LCD panel 57 which is mounted rotatablly on a main body 65 displays the video image which was recorded on video tape (not shown) or is being recorded. A LCD panel switch 56 is used to turn the LCD panel 57 on or off.

When the user is observing the object being recorded through the OVF 51, a light emitted from a light-emitting device 74 in a LCD panel power switching apparatus 70 (described later in reference to FIG. 14) is transmitted through a light-emitting window 58 which is mounted below the OVF 51. This light is reflected from the eye of the user to a light-receiving window 59 which is mounted above the OVF 51, in which a light-receiving device 75 receives the light.

When the camera/video change-over switch 52 is switched to a video mode and a playback button 55 is pushed, the video tape recorder with video camera 63 plays back the video image recorded on the video tape and displays it on the LCD panel 57.

Figure 13A:
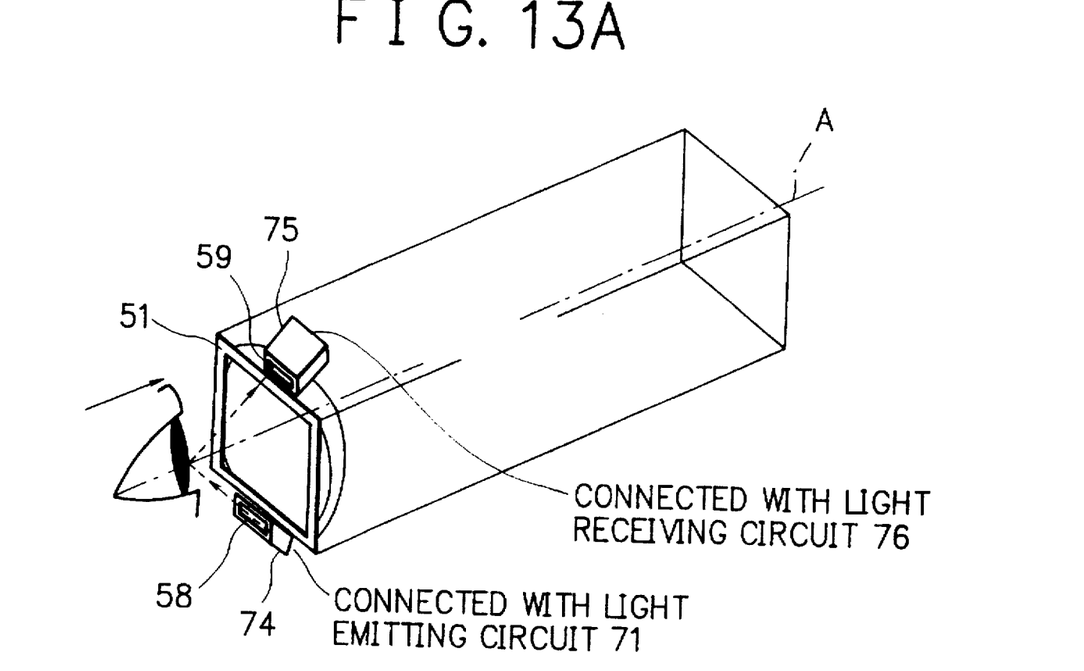
FIGS. 13A and B are views of a construction of the area near the OVF 51 for the video tape recorder with video camera shown in FIG. 11 and FIG. 12.
Figure 13B:
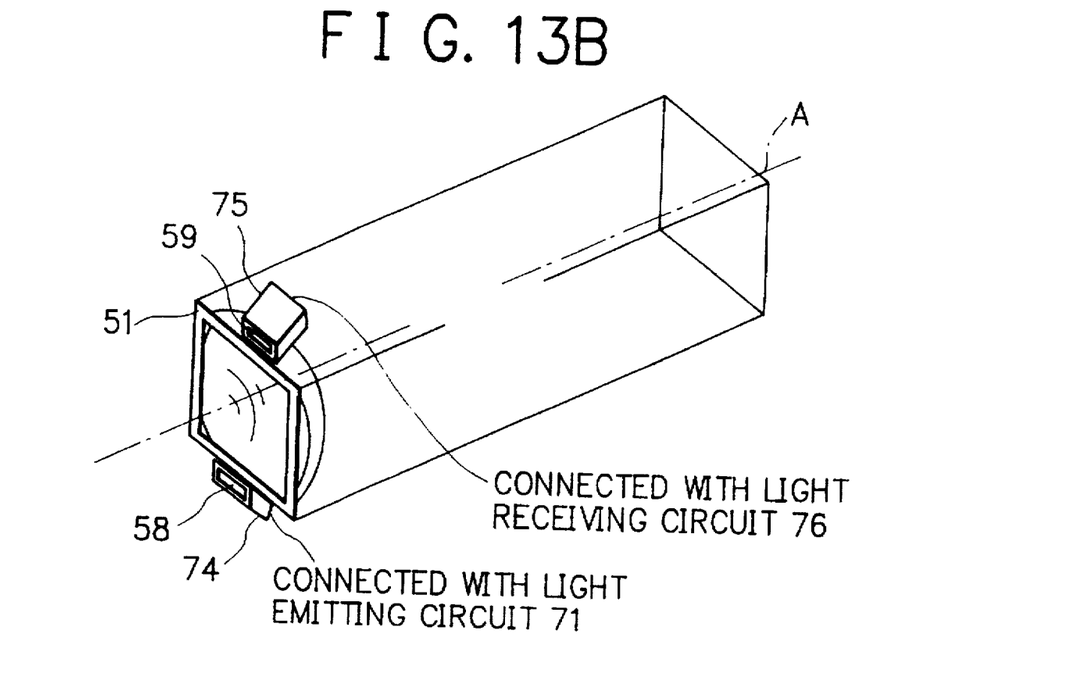

FIG. 13A illustrates a situation in which the eye of the user is close to the OVF 51 shown in FIG. 11 and FIG. 12, and FIG. 13B illustrates a situation in which the eye of the user is not close to the OVF 51. The light-emitting device 74 is mounted behind the light-emitting window 58, and the light-receiving device 75 is mounted behind the light-receiving window 59.

Figure 14:
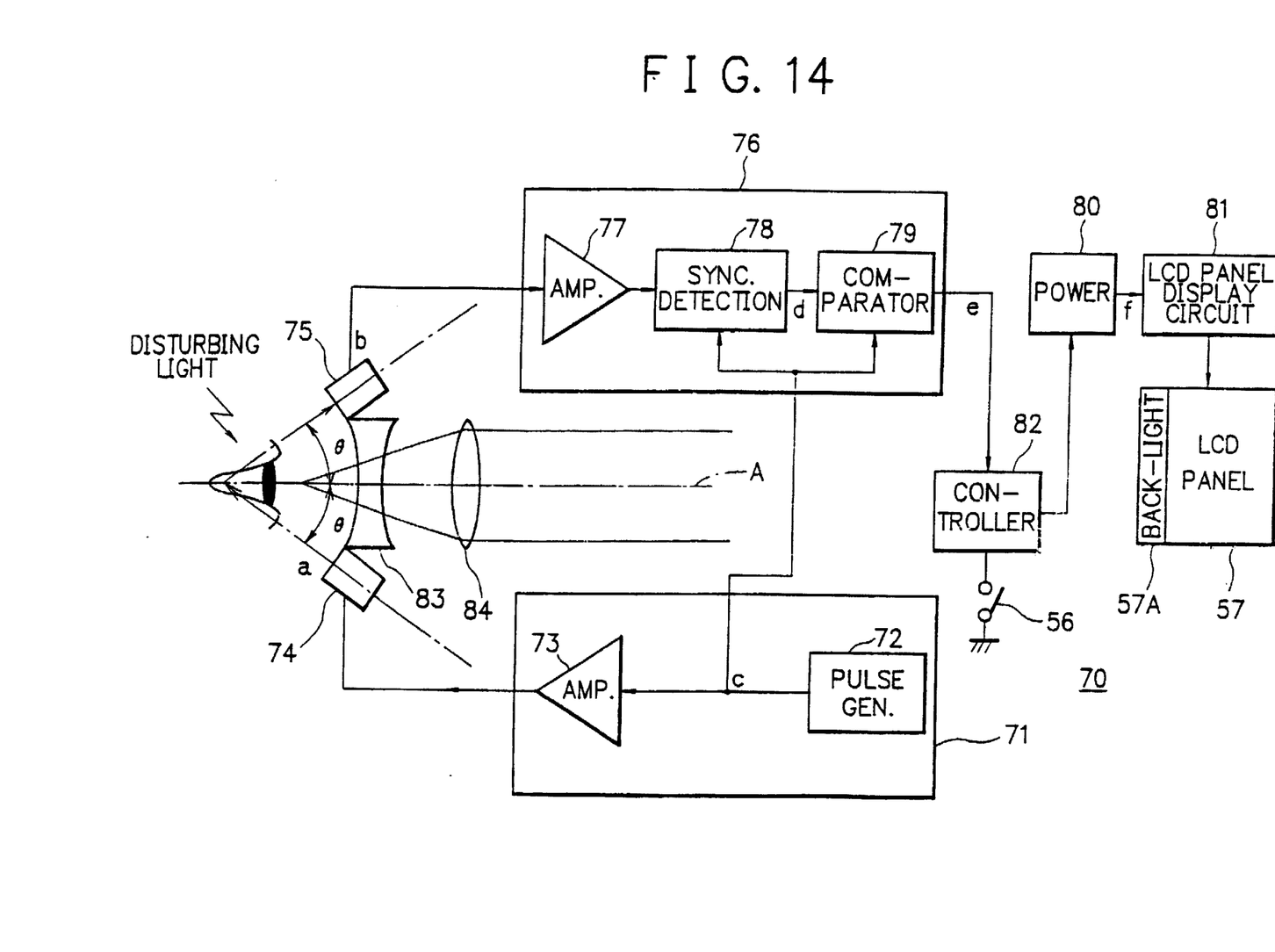
FIG. 14 is a block diagram of a LCD panel power switching apparatus 70.

FIG. 14 illustrates a construction of the LCD panel power switching apparatus 70 which is built into the main body 63. The light-emitting circuit 71 is comprised of a pulse generating circuit 72 and an amplifier 73. The pulse generating circuit 72 generates a pulse signal "c", which is supplied to the amplifier 73, to a synchronous wave detection circuit 78 in a light-receiving detection circuit 76, and to a comparator 79. The amplifier 73 amplifies the inputted pulse signal, which is supplied to the light-emitting device 74 comprised of, for example, a LED for emitting an infrared ray. Such light-emitting device 74 is inclined upward in order to emit an emitted light signal "a" at an angle θ with a base axis A.

The light-receiving device 75 which is comprised of, for example, a photo-diode is inclined downward, in order to be prevented from malfunction by a disturbing light frequently entering from an upper direction, to receive only the emitted light signal "a" from the light-emitting device 74 and to receive a light at an angle −θ with the base axis A (optic axis of a concave lens 83 and a convex lens for inspecting the object to be recorded for the OVF 11). Such light-receiving device 75 receives the emitted light signal "a", and outputs a light-receiving signal "b" to the light-receiving detection circuit 76.

The light-receiving detection circuit 76 is comprised of an amplifier 77, the synchronous wave detection circuit 78, and the comparator 79. The amplifier 77 amplifies the light-receiving signal "b", which is supplied to the synchronous wave detection circuit 78.

The synchronous wave detection circuit 78 detects a wave of the inputted light-receiving signal "b", based on the pulse signal "c", and outputs a wave detection output "d" to the comparator 79.

The comparator 79, comparing this wave detection output "d" with a predetermined reference value, outputs "1" as a comparator output "e" if the wave detection output "d" is greater than the reference value, or output "0" if it is not. Such comparator outputs "e" is supplied to a controller 82. The controller 82 directs a power supply circuit 80 to operate an on/off action for the power supplied to a LCD panel display circuit 81 for driving the LCD panel switch 57 in response to the output from the LCD panel switch 56 and the comparator output "e".

An operation of such video tape recorder with video camera 63 is described below in reference to a time chart in FIG. 15. When the recorder records an image, the user switches the camera/video change-over switch 52 to the camera mode, and pushes the recording button 62, at which time the image of the object is taken in through the camera lens 61 and is recorded on the tape.

Figures 15A, 15B, 15C, 15D, 15E, 15F:
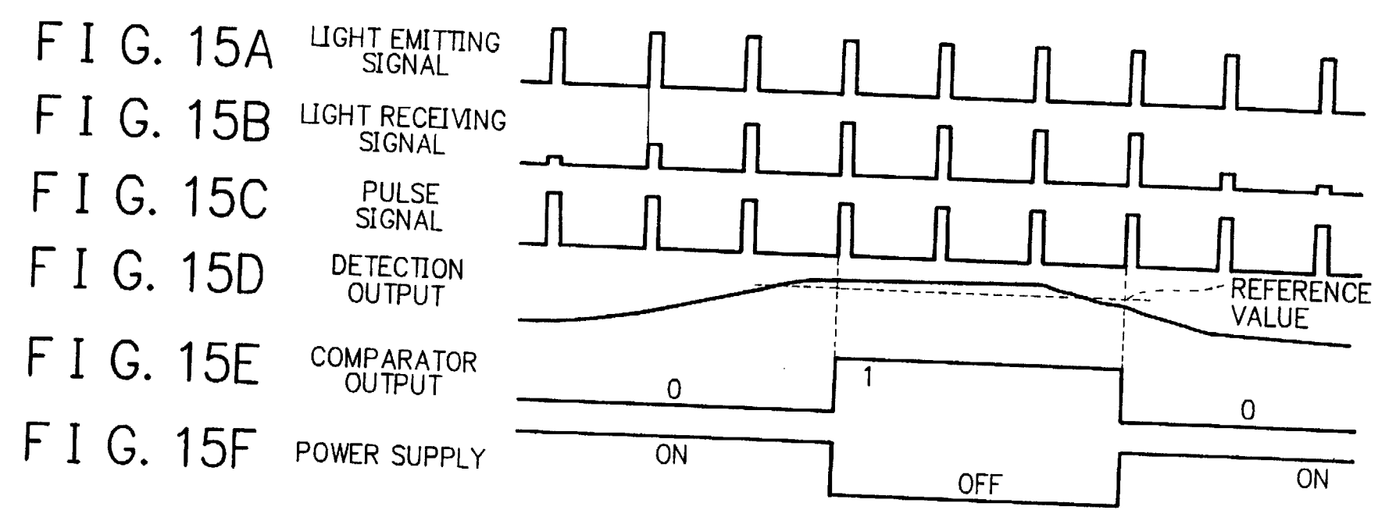
FIG. 15 is a time chart showing an operation of the embodiment shown in FIG. 14.

The pulse signal "c" (FIG. 15C) is generated by the pulse generating circuit 72 during a blank interval of a horizontal synchronizing signal or a vertical synchronizing signal, so as to prevent noise from being displayed on the screen, is amplified by the amplifier 73, and is supplied as an input to the light-emitting device 74 which is comprised of the LED. In response to this pulse signal "c", the light-emitting device 74 emits an emitted light signal (infrared ray) "a" (FIG. 15A) in an upper inclined direction at an angle θ with a base axis A (horizontal line).

When recording an image, the user puts his eye close to the OVF 51. At that time (shown in FIG. 13A), The light from the light-emitting device 74 reflects from the eye of the user to the light-receiving device 75 which is comprised of the photo-diode inclined downward in order to be prevented from receiving a disturbing light from an upper direction. On the other hand, when the user observes through the OVF 51 (as shown in FIG. 13B), the emitted light signal "c" from the light-emitting device 74 is not received by the light-receiving device 75 or, even if it is received, the amount is low because the eye of the user is not close.

The light-receiving device 75 outputs the light-receiving signal "b" (FIG. 15B) to the amplifier 77 in the light-receiving detection circuit 76. The amplifier 77 amplifies this light-receiving signal "b" and supplies it to the synchronous wave detection circuit 78. The synchronous wave detection circuit 78 detects the wave of the light-receiving signal "b", based on the pulse signal "c" which is inputted from the pulse generating circuit 72, and outputs the wave detection output "d" (FIG. 15D) to the comparator 79. As described above, it is possible to prevent the malfunction caused by disturbing light from the outside by having the light-receiving device 75 detecting only the portion of the light, which is synchronized with the pulse signal "c".

The wave detection output "d" is compared with the predetermined reference value by the comparator 79, which outputs "1" as the comparator output "e" if it is more than the reference value, or outputs "0" if it is not. Such comparator output "e" (FIG. 15E) is supplied to the controller 82.

The closer the user is to the OVF 51, the larger the light-receiving signal "b" become. The wave detection output "d" is increased in relation to the light-receiving signal "b". When the wave detection output "d" is greater than the predetermined reference value, in other words, when the user has approached within a specified distance from the OVF 51, the output from the comparator 79 is changed from "0" to "1".

The comparator 79 has a hysteresis characteristic, which allows the output to be inverted at a timing synchronized with the pulse signal "c" instead of being inverted immediately when the wave detection output "d" is above or below the predetermined value (FIGS. 15D and E).

The controller 82 reads the comparator output "e", and controls the power supply circuit 80, controlling the power for the LCD panel display circuit 81. In other words, when the comparator output "e" is "1", the power supplied to the signal processing circuit as well as to the back-light 57A of the LCD panel 57 is turned off even if the LCD panel switch 56 is on (FIG. 15F). On the other hand, when the comparator output "e" is "0", the power is supplied to the LCD panel switch 56 if the switch 56 is on, and is not supplied if it is off.

Accordingly, when the user is observing through the OVF 51, the power is not supplied to the LCD panel 57 even if the LCD panel switch 56 is turned on, and this prevents the power from being wasted. When the LCD panel switch 56 is off, the power is not supplied to the LCD panel 57 when the user is far from the OVF 51, and this also prevents the power from being dissipated needlessly.

A mini-size electronic viewfinder (EVF) can be substituted for the OVF 51 described above.

It will be obvious to those having skill in the art that many changes may be made in the above-described details of the preferred embodiment of the present invention. The scope of the present invention, therefore, should be determined by the following claims.

What is claimed is:

1. An electronic viewfinder comprising:

an ocular unit provided with a pulse light emitter and a light receiver;

sample-hold means for sampling an output signal of said light receiver and for holding sampled signals, said sampling operation timed with a light emitting operation of said pulse light emitter;

mean level detecting means for detecting a mean level of said output signal of said light receiver;

difference detecting means for detecting difference between the signal sampled and held by said sample-hold means and said mean level detected by said mean level detecting means;

first control means which turns off power to a display device when said difference detected by said difference detecting means is less than a predetermined value; and second control means for controlling luminance of said display device according to said mean level detected by said mean level detecting means.

2. The electronic viewfinder in accordance with claim 1, wherein said first control means turns off power to said display device irrespective of the magnitude of said difference detected by said difference detecting means, when said mean level detected by said mean level detecting means is greater than a predetermined value.

3. The electronic viewfinder in accordance with claim 2, wherein said first control means turns on power to said display device irrespective of said magnitude of said difference detected by said difference detecting means, when said mean level detected by said mean level detecting means is greater than a predetermined value.

4. The electronic viewfinder in accordance with claim 3, wherein said second control means varies said luminance of said display device continuously according to said mean level detected by said mean level detecting means.

5. The electronic viewfinder in accordance with claim 4, wherein said pulse light emitter emits infrared rays, and a visible radiation cutting filter is disposed in front of said light receiver.

6. The electronic viewfinder in accordance with claim 5, wherein said light emitting frequency of said pulse light emitter is 10 Hz or less.

7. An electronic viewfinder for displaying a video image electrically, comprising:

viewfinder means through which a user observes an object optically;

display means for displaying an image electrically for a plurality of users, the size of said display means being larger than said viewfinder means;

detection means for detecting an approach of a user to said viewfinder means; and control means for controlling power for said display means in response to a wave detection output from said detection means, said control means turning off said display means in response to detection of said user by said detection means.

8. The electronic viewfinder in accordance with claim 7, wherein said detection means comprises:

light emitting means for emitting a light in an upper inclined direction; and light receiving means mounted above said light emitting means for receiving said light from said light emitting means from a lower inclined direction.

9. The electronic viewfinder in accordance with claim 8, wherein said light emitting means is provided below said viewfinder means, and said light receiving means is provided above said viewfinder means.

10. The electronic viewfinder in accordance with claim 9, wherein said detection means has wave detection means for performing synchronizing detection of an output from said light receiving means.

11. The electronic viewfinder in accordance with claim 10, wherein said display means has a back-light means, and said control means controls, at least, power to said back-light means.

12. A camera having an electronic viewfinder comprising:

a lens for receiving light from an object;

a video device for converting said light received by said lens into an electric signal;

a video signal processing means for converting said electric signal supplied from said video device into a video signal;

an ocular unit provided with a pulse light emitter and a light receiver;

sample-hold means for sampling an output signal of said light receiver and for holding sampled signals, said sampling operation timed with a light emitting operation of said pulse light emitter;

mean level detecting means for detecting a mean level of said output signal of said light receiver;

difference detecting means for detecting difference of the signal sampled and held by said sample-hold means from said mean level detected by said mean level detecting means;

first control means which turns off power to a display device when said difference detected by said difference detecting means is less than a predetermined value; and second control means for controlling luminance of said display device according to said mean level detected by said mean level detecting means.

13. The camera in accordance with claim 12, wherein said first control means turns off power to said display device irrespective of the magnitude of said difference detected by said difference detecting means, when said mean level detected by said mean level detecting means is greater than a predetermined value.

14. The camera in accordance with claim 13, wherein said first control means turns on power to said display device irrespective of the magnitude of said difference detected by said difference detecting means, when said mean level detected by said mean level detecting means is greater than a predetermined value.

15. The camera in accordance with claim 14, wherein said second control means varies said luminance of said display device continuously according to said mean level detected by said mean level detecting means.

16. The camera in accordance with claim 15, wherein said pulse light emitter emits infrared rays, and a visible radiation cutting filter is positioned in front of said light receiver.

17. The camera in accordance with claim 16, wherein said light emitting frequency of said pulse light emitter is 10 Hz or less.

18. An electronic viewfinder for displaying a video image electrically, comprising:

a lens for receiving light from an object;

a video device for converting said light received by said lens into an electric signal;

video signal processing means for converting said electric signal supplied from said video device into a video signal;

viewfinder means through which a user observes an object optically;

display means for displaying an image electrically for a plurality of users, the size of said display means being larger than said viewfinder means;

detection means for detecting an approach of a user to said viewfinder means; and control means for controlling power to said display means in response to a wave detection output from said detection means, said control means turning off said display means in response to detection of said user by said detection means.

19. The electronic viewfinder in accordance with claim 18, wherein said detection means comprises:

light emitting means for emitting a light in an upper inclined direction; and light receiving means mounted above said light emitting means for receiving said light from said light emitting means from a lower inclined direction.

20. The electronic viewfinder in accordance with claim 19, wherein said light emitting means is provided below said viewfinder means, and said light receiving means is provided above said viewfinder means.

21. The electronic viewfinder in accordance with claim 20, wherein said detection means has wave detection means for performing synchronizing detection of an output from said light receiving means.

22. The electronic viewfinder in accordance with claim 21, wherein said display means has a back-light means, and said control means controls, at least, power to said back-light means.

* * * * *